United States Patent [19]
Hall et al.

[11] 3,984,342
[45] Oct. 5, 1976

[54] PROCESS FOR AGGLOMERATING SODIUM CARBONATE PEROXIDE

[75] Inventors: Richard E. Hall, Trenton; Sushil K. Bhalla, Cranbury; both of N.J.

[73] Assignee: FMC Corporation, Philadelphia, Pa.

[22] Filed: Oct. 15, 1974

[21] Appl. No.: 514,529

Related U.S. Application Data

[63] Continuation-in-part of Ser. No. 418,801, Nov. 23, 1973, abandoned.

[52] U.S. Cl. .............................. 252/186; 23/313 R; 252/99; 252/383; 264/117; 423/272
[51] Int. Cl.² ...................... C01B 15/04; B01J 2/12
[58] Field of Search ..................... 252/186, 383, 99; 264/117; 23/313; 423/272

[56] References Cited
UNITED STATES PATENTS

| 2,979,464 | 4/1961 | Pistor .................................... 23/313 |
| 3,227,790 | 1/1966 | Bretschneider et al. ............. 264/117 |
| 3,463,618 | 8/1969 | Harris et al. ........................... 23/313 |
| 3,664,961 | 5/1972 | Norris .................................... 23/313 |
| 3,773,678 | 11/1973 | Munday ................................. 23/313 |

*Primary Examiner*—Benjamin R. Padgett
*Assistant Examiner*—Irwin Gluck

[57] ABSTRACT

Strong, stable, free-flowing agglomerates of sodium carbonate peroxide are produced by contacting rotary agitated sodium carbonate peroxide with an aqueous agglomerating solution having a viscosity of at least 30 centipoise and containing less than 20% by weight agglomerating agent.

8 Claims, No Drawings

PROCESS FOR AGGLOMERATING SODIUM CARBONATE PEROXIDE

CROSS REFERENCE TO RELATED APPLICATIONS

This application is a continuation-in-part of U.S. Ser. No. 481,801 filed Nov. 23, 1973, now abandoned.

This invention relates to a novel process for agglomerating sodium carbonate peroxide with an aqueous agglomerating solution having a viscosity of at least 30 centipoise.

Sodium carbonate peroxide is a crystalline compound having the formula $2Na_2CO_3 \cdot 3H_2O_2$ which is capable of releasing hydrogen peroxide in aqueous solution. Because of this property, sodium carbonate peroxide is useful as a bleaching agent in detergent formulations. When preparing detergent formulations with sodium carbonate peroxide, the formulations are blended in a dry state and subsequently packaged. The presence of water, or substantial amounts of moisture are avoided to prevent decomposition of the sodium carbonate peroxide.

One of the problems that has arisen in formulating such detergent compositions has been the segregation of some components of the detergent formulation after packaging. This segregation arises from the use of commonly crystallized sodium carbonate peroxide which has a higher bulk density and smaller particle size distribution than the other particles normally employed in the detergent formulation.

Various processes have been developed to agglomerate sodium carbonate peroxide particles having lower bulk densities and higher particle size distributions. One such process is disclosed in U.S. Pat. No. 3,463,618. This process produces agglomerates of sodium carbonate peroxide by forming a paste of sodium carbonate peroxide, passing the paste through a sieve having an opening of 0.5 to 2.5 mm, drying the paste and again passing the agglomerates through a sieve having an opening of 0.5 to 2.5 mm. Alternatively, sodium carbonate peroxide is contacted with water and an inert medium and maintained in a turbulent state until a granular form is produced.

Other attempts to produce agglomerates of sodium carbonate peroxide have not been successful. The agglomerates produced generally contain low active oxygen contents and are unstable under normal storage conditions with regard to loss of active oxygen.

It has been unexpectedly discovered that strong, stable, free-flowing agglomerates of sodium carbonate peroxide are produced by subjecting particles of sodium carbonate peroxide to rotary agitation, contacting the particles with an aqueous agglomerating solution having a viscosity of at least 30 centipoise and containing less than 20% by weight agglomerating agent, continuing the rotary agitation of the resultant wet particles until they become agglomerated, drying the resulting wet agglomerated particles at temperatures of about 20° to about 150°C, and recovering dry agglomerated particles of sodium carbonate peroxide having bulk densities of about 0.4 to about 1.0 g/cc.

The sodium carbonate peroxide particles produced according to this invention are sufficiently strong to resist being crushed by conventional handling equipment used in formulating detergents. The agglomerates have commercially acceptable bulk densities of about 0.4 to about 1.0 g/cc and commercially acceptable particle size distributions which render the product compatible with other detergent formulation ingredients. The product is free-flowing and consequently can be handled easily. The use of an aqueous agglomerating solution having a viscosity of at least 30 centipoise and containing less than 20% by weight agglomerating agent also improves the storage stability of the sodium carbonate peroxide.

To carry out the invention, finely divided particles of sodium carbonate peroxide or a mixture of sodium carbonate peroxide and minor amounts of other water-soluble solid materials, are used as the feed material. The water-soluble solid materials are those materials commonly found in detergent formulations, such as sodium carbonate, sodium tripolyphosphate, sodium sulfate, wetting agents and the like.

The sodium carbonate peroxide may be obtained by any of the known prior art processes. These processes include crystallization from a mother liquor with or without inert solvents, and methods that salt out the sodium carbonate peroxide from solution. The sodium carbonate peroxide feed should be water dry and should be finely divided, that is, having a particle size less than about 50 mesh (U.S. Standard Sieve), and preferably, less than about 100 mesh. If the crystal feed is wet or if it contains larger than about 50 mesh particles, the sodium carbonate peroxide forms into large lumps during agglomeration which are not commercially acceptable. The sodium carbonate peroxide particles employed in this invention are either produced commercially in the form of a powder, or they may be obtained by grinding granular material to the appropriate size. By employing particles of this finely divided size, an agglomerated product is produced having decreased bulk densities and fairly tight particle size distributions.

The sodium carbonate peroxide feed is added continuously to a rotating drum or a rotating disc. The apparatus may be equipped with baffles in order to prevent material from adhering to the drum or disc surface. The term "rotary agitation" is intended to cover the tumbling, rolling or rotating movement imparted to the particles by the movement of the drum or disc. The preferred equipment is a rotating disc, such as a Dravo-Lurgi Disc manufactured by the Dravo Company. When the sodium carbonate peroxide is in rotary agitation, it is contacted with the aqueous agglomerating solution. The preferred contacting method is by spraying the aqueous solution onto the moving particles.

The agglomerating agents that are employed in this invention must form viscous solutions having at least 30 centipoise in less than 20% by weight concentrations. The agglomerating agents should also be: (a) readily soluble in water and alkali solutions; (b) neutral or alkaline in solution; (c) non-hygroscopic or essentially non-hygroscopic; (d) low in transition metal content; and (e) inert to sodium carbonate peroxide. Agglomerating agents which meet the primary criteria as well as the secondary criteria can be selected from a large number of materials. The following materials are examples of useful agglomerating agents: salts of carboxymethylcellulose such as sodium carboxymethylcellulose; interpolymer of methyl vinyl ether and maleic anhydride and crosslinked, or esterified interpolymer of methyl vinyl ether and maleic anhydride; polyvinylpyrrolidone and crosslinked, or comonomers of polyvinylpyrrolidone; guar gum and crosslinked, or substituted guar gum; and carboxypolymethylenes. The preferred agglomerating agents are sodium carboxymethylcellulose, interpolymer of methyl vinyl ether and maleic anhydride, polyvinylpyrrolidone, guar gum and carboxypolymethylene.

The aqueous solution containing the agglomerating agent has a viscosity of at least 30 centipoise, and preferably between about 30 and about 200 centipoise, and most preferably between about 55 and about 85 centipoise. These viscosities have been found sufficient to produce agglomerated products which have an even particle size consistency as well as agglomerated particles which do not break easily. Agglomerating solutions having a viscosity less than about 30 centipoise should be avoided to prevent large fluctuations in particle sizes. These low viscosities generally produce particles with a wide (−10+100 mesh) and inconsistent particle size distribution which segregate when stored. Agglomerating solutions having viscosities above 200 centipoise may be employed even though they are not preferred. These high viscosity solutions are often difficult to produce, maintain, handle, and spray onto the rotating particles.

The viscosity of the agglomerating solution must be obtained at low agglomerating agent concentrations. The agglomerating agent concentrations are less than 20% by weight, preferably less than about 5% by weight, and most preferably less than about 2% by weight in order to produce the desired viscosities. These low agglomerating agent concentrations are necessary to prevent dilution of the sodium carbonate peroxide in the final product. This dilution would lower the active oxygen content in the dried agglomerated product. These low concentrations of agglomerating agent are also preferred because they appear to increase the stability of the sodium carbonate peroxide in the final product.

The amount of aqueous agglomerating solution which contacts the sodium carbonate peroxide will vary depending upon such factors as the amount of sodium carbonate peroxide, the viscosity of the solution, and the amount of agglomerating agent present in the solution. In general up to about 3% on a dry basis of agglomerating agent or a corresponding amount of a 5 to 20 weight percent of aqueous agglomerating solution based on sodium carbonate peroxide is sufficient to produce a commercially acceptable agglomerated product.

The aqueous agglomerating solution that contacts the rotating particles should have a temperature from about 10° to about 70°C, and preferably from about 20° to about 35°C. Lower temperatures are preferable to higher temperatures since higher temperatures generally lower solution viscosities to unacceptable levels. The sodium carbonate peroxide which is under rotary agitation may also be heated although room temperatures are satisfactory.

Upon contacting the rotary agitated sodium carbonate peroxide particles with the aqueous agglomerating solution, the individual particles begin to agglomerate. The agglomerates continue to increase in size and are removed from the agglomerating apparatus when they reach the desired size. The desired size of the agglomerated product is about 16 to about 50 mesh. The amount of agglomerating agent that remains on the final product is about 0.01% to about 3.0% by weight.

The wet agglomerates, after being removed from the agglomerating zone, are dried to remove the free water which is present. The drying stage can be carried out by allowing the agglomerates to stand at room temperature, that is around 20°C, or preferably by heating the agglomerates to moderate temperatures, that is up to about 150°C. Alternatively, the agglomerates may be dried by vacuum drying. The preferred drying condition is moderate heating of the agglomerates at temperatures high enough to dry off the excess water, but low enough to prevent loss of active oxygen from the agglomerated sodium carbonate peroxide. Consequently, the most perferred drying temperature is about 60°C. Any apparatus may be employed for drying the agglomerates. A convenient apparatus for drying is a fluid-bed drier wherein the particles are supported on an upward flowing stream of dry heated air or other drying gas.

The sodium carbonate peroxide products produced according to this invention are strong, stable, free-flowing compositions containing about 0.01 to about 3.0% by weight agglomerating agent and have bulk densities of about 0.4 to about 1.0 g/cc and preferably about 0.8 to about 1.0 g/cc and at least 70% particle sizes of about 16 to about 50 mesh.

The following examples are given to illustrate the invention, but are not deemed to be limiting thereof. All mesh sizes are based on U.S. Standard Mesh Sizes. All percentages given are based upon weight unless otherwise indicated.

EXAMPLE 1

Sodium carbonate peroxide particles, having an active oxygen content of 15.0%, a bulk density of 0.75 g/cc and a size of 10% =140 mesh and 75% =325 mesh, were continuously added onto a 39 inch diameter Dravo-Lurgi Disc rotating at 19 rpm and inclined at 48°. The tumbling particles on the disc were then sprayed with an aqueous agglomerating solution in a 1 to 7 weight ratio of agglomerating solution to feed particles respectively. As the agglomerating solution was sprayed onto the tumbling particles, they commenced to agglomerate. The wet agglomerated sodium carbonate peroxide particles continued to grow until they reached the size where they were able to spill from the rotating disc. Fine particles of −100 mesh were separated for recycling. The spilled particles were dried in a fluid-bed maintained at 55°C for an average residence time of seven minutes. The dry particles were analyzed for active oxygen content, bulk density, particle size, frangibility and 5-day stability. The results of the analysis and the make up of the agglomerating solution are set forth in Table I. Three runs were made employing various agglomerating agents at different concentrations.

The frangibility test is a measure of the strength of the dry particles and is conducted as follows. A sample of the particles is screened and 100 grams of the −10 +100 mesh fraction is placed on a 100 mesh screen in a RO-TAP apparatus. Three 3.5 cm. diameter rubber balls, each weighing 28 grams, are placed in the 100 mesh screen, covered, and the RO-TAP activated for 15 minutes. The fraction passing through the −100 mesh screen compared to the weight of the sample, is reported as percent frangibility. The smaller the percent frangibility, the more resistant the sample is to breakdown. Frangibility values of 11% or less are considered low and acceptable.

The five-day stability test is conducted as follows. A one gram sample is placed in a dry, clean, 250 ml wide mouth Erlenmeyer flask and covered with polyethylene-coated Kraft paper which is sealed about the edges of the flask. The sealed flask is placed in a controlled atmosphere at 120 ± 2°F and 90 ± 2% relative humidity for 5 days. The loss of active oxygen after 5 days is determined by ceric ammonium sulfate titration to a ferroin end point. The ratio of the active oxygen content remaining over the original active oxygen content of the sample is reported as percent stability. Stability values over 70% are considered necessary for the product to have acceptable storage stability.

EXAMPLE 2

The agglomerated sodium carbonate peroxide particles produced in Inventive Run 1 and Comparative Run B according to Example 1 were added to commercially available laundry detergent formulations to determine the 5-day stability of the particles. The agglomerated particles were blended with phosphate-based and non-phosphate-based detergents so that the blended detergents contained 1 weight percent of agglomerated particles. The results of the 5-day stability test performed according to Example 1 are set forth in Table II. The blended detergents containing carboxymethylcellulose agglomerated sodium carbonate peroxide were found to be effective laundering compositions which did not segregate during storage.

The carboxymethylcellulose used in Examples 1 and 2 as the agglomerating agent was Hercules CMC-7MT identified in the 1971 publication of Hercules entitled "CMC-T." This material (CMC-7MT) contains 96% carboxymethylcellulose, it has a degree of substitution of about 0.7, a polymerization degree of 1100, and a molecular weight of 250,000.

EXAMPLE 3

The procedure of Example 1 was repeated with various aqueous agglomerating solutions having a viscosity of at least 30 centipoise and containing less than 20% by weight agglomerating agent. The dry particles were analyzed for active oxygen content, bulk density, particle size, frangibility and 5-day stability. The results of the analysis and the make up of the agglomerating solution are set forth in Table III.

The carboxymethylcellulose used in Run 2 as the agglomerating agent was Hercules CMC-7H identified in the 1971 publication of Hercules Inc. entitled "Cellulose Gum." This material (CMC-7H) contains 96% carboxymethylcellulose, it has a degree of substitution of about 0.7, a polymerization degree of 3200, and a molecular weight of 700,000. The polyvinylpyrrolidone used in Run 3 as the agglomerating agent was GAF Corp. PVP K-90 identified in *Encyclopedia of Chemical Technology*, Volume 21, second edition, pages 427 to 440, 1970. The carboxypolymethylene used in Run 4 as the agglomerating agent was B. F. Goodrich Carbopol 941. The guar gum used in Run 5 as the agglomerating agent was Stein, Hall and Co. Inc. Jaguar A-20D. The interpolymer of polymethyl vinyl ether and maleic anhydride used in Run 6 as the agglomerating agent was GAF Corp. Gantrez AN-169.

TABLE I

| Example 1 | Agglomerating Agent | Weight % In Water | Viscosity In Centipoise | Percentage Active Oxygen | Bulk Density g/cc |
|---|---|---|---|---|---|
| Inventive Run 1 | Carboxymethylcellulose | 1.72 | 65 | 15.0 | 0.80 |
| Comparative Run A | Carboxymethylcellulose | 1.46 | 25 | 15.0 | 0.90 |
| Comparative Run B | Sodium Silicate in a mole ratio of 1.8 SiO$_2$/Na$_2$O | 40.00 | 65 | 14.5 | 0.80 |

| Example 1 | 5-Day Stability Percent Active Oxygen Remaining | Frangibility Percentage | Particle Size Distribution U.S. Standard Mesh | | |
|---|---|---|---|---|---|
| | | | −12+40 | −40+100 | −100 |
| Inventive Run 1 | 85 | 8 | 81 | 15 | 4.0 |
| Comparative Run A | 85 | 15 | Large Variations | | |
| Comparative Run B | 75 | 8 | 63 | 34 | 3.0 |

TABLE II

| | 5-Day Stability | |
|---|---|---|
| Agglomerating Agent | Sodium Silicate-Molar Ratio 1.8 SiO$_2$/Na$_2$O | Carboxymethylcellulose Vicosity 65 Centipoise |
| Phosphate Based | | |
| Product A | 81 | 94 |
| Product B | 68 | 92 |
| Product C | 80 | 92 |
| Non-Phosphate Based | | |
| Product D | 77 | 93 | carboxymethylcellulose, it has a degree of substitution

TABLE III

| Example 3 | Agglomerating Agent | Weight % In Water | Viscosity In Centipoise | Percentage Active Oxygen | Bulk Density g/cc |
|---|---|---|---|---|---|
| Inventive Run 2 | Carboxymethylcellulose | 0.25 | 70 | 14.6 | 0.69 |
| Inventive Run 3 | Polyvinylpyrrolidone | 4.48 | 64 | 14.7 | 0.66 |
| Inventive Run 4 | Carboxypolymethylene | 0.32 | 76 | 14.4 | 0.68 |

TABLE III-continued

| Example 3 | | | | | |
|---|---|---|---|---|---|
| Inventive Run 5 | Guar Gum | 0.33 | 75 | 14.7 | 0.65 |
| Inventive Run 6 | Interpolymer of polymethyl vinyl ether and maleic anhydride | 0.31 | 82 | 14.7 | 0.70 |

| Example 3 | 5-Day Stability Percent Active Oxygen Remaining | Frangibility Percentage | Particle Size Distribution U.S. Standard Mesh | | |
|---|---|---|---|---|---|
| | | | −12+40 | −40+100 | −100 |
| Inventive Run 2 | 83 | 8 | 95 | 2 | 3 |
| Inventive Run 3 | 87 | 10 | 76 | 15 | 9 |
| Inventive Run 4 | 89 | 9 | 70 | 21 | 9 |
| Inventive Run 5 | 74 | 10 | 78 | 11 | 11 |
| Inventive Run 6 | 90 | 11 | 80 | 8 | 12 |

The invention being thus described, it will be obvious that the same may be varied in many ways. Such variations are not to be regarded as a departure from the spirit and scope of the invention, and all such modifications are intended to be included within the scope of the following claims.

What is claimed is:

1. A process for producing strong, stable, free-flowing agglomerates of sodium carbonate peroxide, which comprises:

subjecting particles of sodium carbonate peroxide having a size below about 50 mesh to rotary agitation;

contacting the rotating particles with an aqueous agglomerating solution having a viscosity of at least 30 centipoise and containing less than 20% by weight agglomerating agent selected from the group consisting of salts of carboxymethylcellulose; interpolymer of methyl vinyl ether and maleic anhydride; crosslinked or esterfied interpolymer of methyl vinyl ether and maleic anhydride; polyvinylpyrollidone; crosslinked or comonomers of polyvinylpyrollidone; guar gum; crosslinked or substituted guar gum; and carboxypolymethylenes;

continuing the rotary agitation of the resultant wet particles until they become agglomerated;

drying the resulting wet agglomerated particles at temperatures from about 20°C to about 150°C; and recovering dry agglomerated particles of sodium carbonate peroxide having bulk densities of about 0.4 to about 1.0 g/cc and at least 70% particle sizes of about 16 to about 50 mesh.

2. The process of claim 1 wherein the aqueous agglomerating solution contains less than about 5% by weight agglomerating agent and has a viscosity between about 30 and about 200 centipoise.

3. The process of claim 1 wherein the aqueous agglomerating solution contains less than about 2% by weight agglomerating agent and has a viscosity between about 55 and about 85 centipoise.

4. The process of claim 1 wherein the aqueous agglomerating solution is sprayed onto the rotating sodium carbonate peroxide particles.

5. The process of claim 1 wherein the agglomerating agent is selected from a material consisting of sodium carboxymethylcellulose, interpolymer of methyl vinyl ether and maleic anhydride, polyvinylpyrrolidone, guar gum and carboxypolymethylene.

6. A process for producing strong, stable, free-flowing agglomerates of sodium carbonate peroxide, which comprises:

subjecting particles of sodium carbonate peroxide having a size below about 50 mesh to rotary agitation;

contacting the rotating particles with an aqueous agglomerating solution having a viscosity between about 30 and about 200 centipoise and containing less than 20% by weight agglomerating agent selected from a material consisting of sodium carboxymethylcellulose, interpolymer of methyl vinyl ether and maleic anhydride, polyvinylpyrrolidone, guar gum and carboxypolymethylene;

continuing the rotary agitation of the resultant wet particles until they become agglomerated;

drying the resulting wet agglomerated particles at temperatures from about 20° to 150°C; and recovering dry agglomerated particles of sodium carbonate peroxide having bulk densities of about 0.4 to about 1.0 g/cc and at least 70% particle sizes of about 16 to about 50 mesh.

7. A strong, stable free-flowing agglomerated sodium carbonate peroxide composition which comprises sodium carbonate peroxide and about 0.01 to about 3.0% by weight agglomerating agent selected from a material consisting of sodium carboxymethylcellulose, interpolymer of methyl vinyl ether and maleic anhydride, polyvinylpyrrolidone, guar gum and carboxypolymethylene and having a bulk density of about 0.4 to about 1.0 g/cc and at least 70% particle sizes of about 16 to about 50 mesh.

8. The composition of claim 7 which comprises particles having a bulk density of about 0.8 to about 1.0 g/cc and about 0.01 to about 3.0% by weight carboxymethylcellulose.

* * * * *

UNITED STATES PATENT OFFICE
CERTIFICATE OF CORRECTION

PATENT NO. : 3,984,342
DATED : October 5, 1976
INVENTOR(S) : Richard E. Hall et al.

It is certified that error appears in the above-identified patent and that said Letters Patent are hereby corrected as shown below:

Column 1, line 8, "481,801" should read ---418,801---.
Column 4, line 31, "10%=140 mesh" should read ---10% +140 mesh---.
Column 4, line 31, "75%=325 mesh" should read ---75% +325 mesh---.
Column 6, Table II, third column heading, "Vicosity" should read ---Viscosity---.
Column 7, line 17, "deparature" should read ---departure---.
Column 7, lines 35-36, "polyvinylpyrollidone" should read ---polyvinylpyrrolidone---.
Column 7, lines 36-37, "polyvinylpyrollidone" should read polyvinylpyrrolidone---.
Column 8, line 43, "stable" should read ---stable,---.
Column 8, line 51, "0.4to" should read ---0.4 to---.

Signed and Sealed this

Twelfth Day of April 1977

[SEAL]

Attest:

RUTH C. MASON
Attesting Officer

C. MARSHALL DANN
Commissioner of Patents and Trademarks